United States Patent [19]
Pierce

[11] 4,027,989
[45] June 7, 1977

[54] CHAIN ANCHOR

[76] Inventor: Harless Pierce, 1212 W. Longview Ave., Stockton, Calif. 95207

[22] Filed: Aug. 13, 1976

[21] Appl. No.: 714,236

[52] U.S. Cl. .............................. 403/291; 24/116 R; 114/200; 403/316
[51] Int. Cl.² .......................................... F16D 1/00
[58] Field of Search ............ 403/3, 4, 83, 104, 107, 403/291, 315, 316, 331, 405; 24/116 R, 116 A; 114/218, 200, 179

[56] References Cited
UNITED STATES PATENTS

| 1,082,813 | 12/1913 | McCarthy | 24/116 R |
| 2,537,326 | 1/1951 | Brawand | 403/291 X |
| 2,680,594 | 6/1954 | Jackson | 114/179 X |
| 2,973,566 | 3/1961 | Elsner | 24/116 R |
| 3,125,355 | 3/1964 | Snuggins | 24/116 R X |

FOREIGN PATENTS OR APPLICATIONS
137,857 10/1952 Sweden .............................. 114/200

Primary Examiner—Wayne L. Shedd
Attorney, Agent, or Firm—Roger B. Webster

[57] ABSTRACT

A chain anchor which provides for manual quick engagement of a chain with a fixed anchor member, and manual quick disengagement of the chain from said anchor member, both readily, conveniently, and without the use of tools; the structural configuration of such chain-engaging anchor member, together with an associated guard, precluding accidental escape of the chain from the anchor member yet without hindering such manual quick engagement and manual quick disengagement of the chain.

14 Claims, 6 Drawing Figures

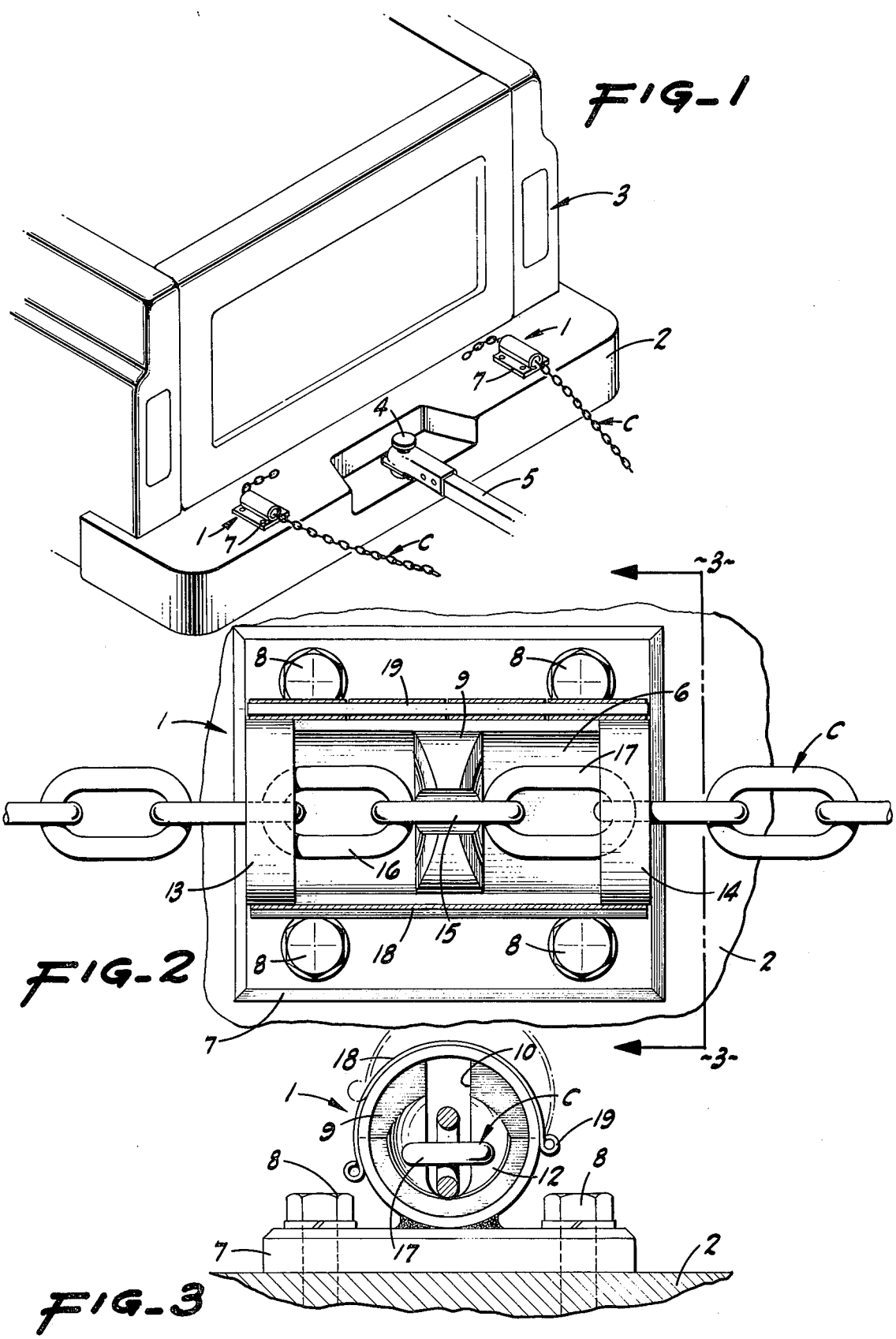

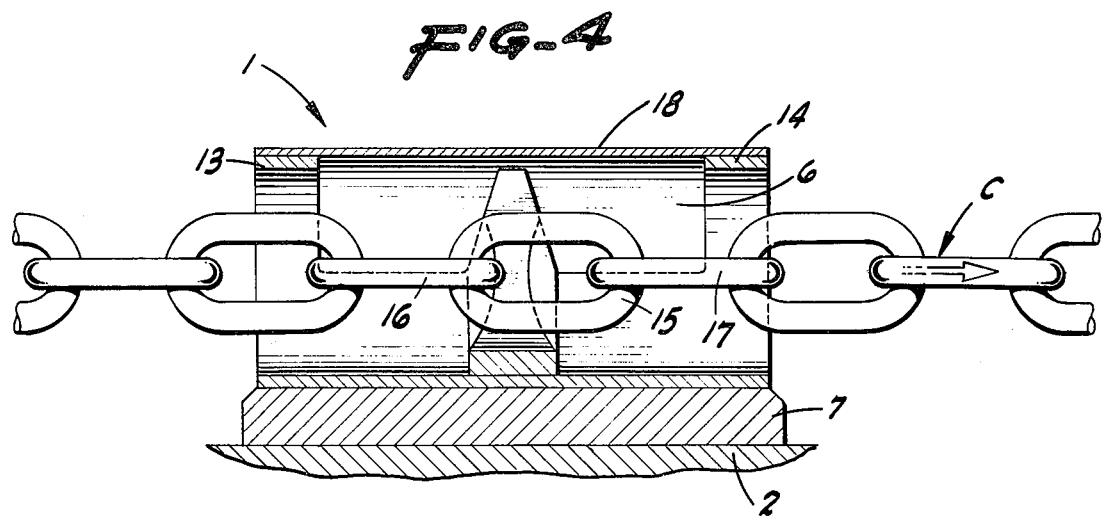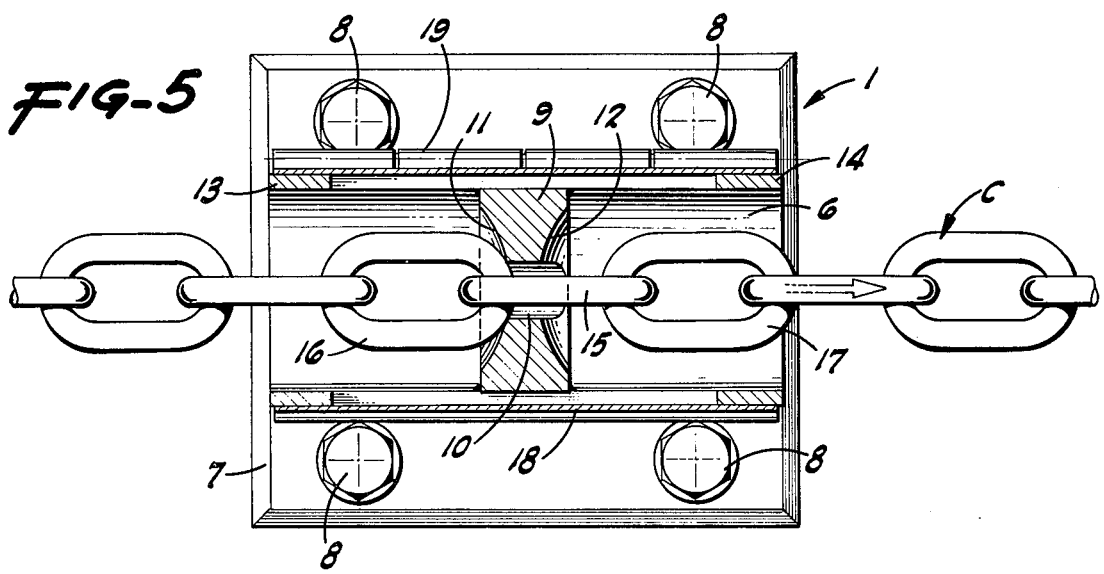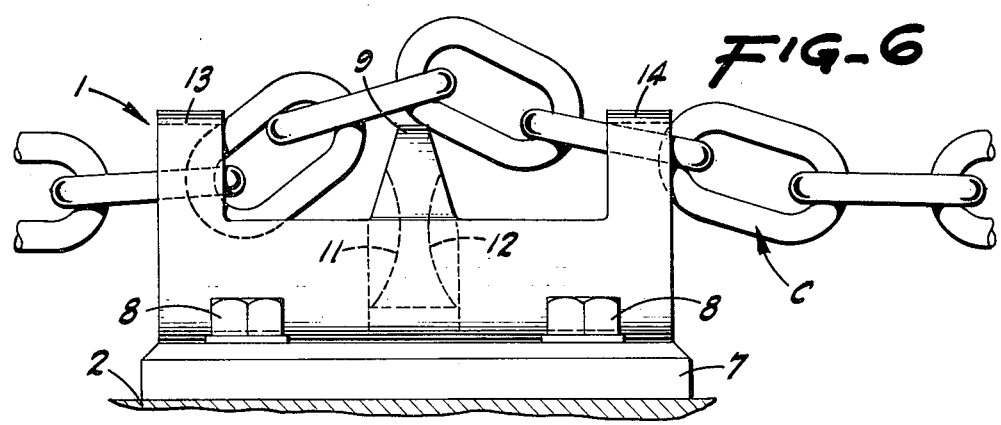

CHAIN ANCHOR

BACKGROUND OF THE INVENTION

1. Field of the Invention

This invention relates, in general, to a device for detachably anchoring a chain to a fixed object; such device being especially designed, but not limited, for end-connecting a corresponding safety chain to a vehicle towing a trailer. Heretofore, the available chain anchors for such purpose have been inconventient to use and were not readily engaged in that —in many instances—the use of bolts and tools was required. The present invention was conceived in a successful effort to provide a chain anchor which avoids such inconvenience.

2. The Prior Art

U.S. Pat. Nos. 13,593; 13,760; 157,736 and 293,657 represent the prior art to the extent known to applicant, and applicant has no knowledge of any prior art disclosing the particular structure of the herein-claimed chain anchor.

SUMMARY OF THE INVENTION

The present invention embraces, as a major object, a chain anchor which provides for manual quick engagement of a chain with a fixed anchor member, and manual quick disengagement of the chain from said anchor member, both readily, conveniently, and without the use of tools; the structural configuration of such chain-engaging anchor member, together with an associated guard, precluding accidental escape of the chain from the anchor member yet without hindering such manual quick engagement and manual quick disengagement of the chain.

The present invention provides, as a further object, a chain anchor which is designed for ease and economy of manufacture.

The present invetion provides, as a still further object, a practical, reliable, and durable chain anchor, and one which is exceedingly effective for the purpose for which it is designed.

BRIEF DESCRIPTION OF THE DRAWINGS

FIG. 1 is a fragmentary perspective view showing a pair of transversely spaced, bumper-mounted, chain anchors as in use with corresponding safety chains extending between a vehicle and trailer.

FIG. 2 is an enlarged plan view, with the cover in section, of one such chain anchor; the view illustrating initial placement of a chain link in the anchor block.

FIG. 3 is an end elevation, on substantially line 3—3 of FIG. 2, of the chain anchor.

FIG. 4 is an enlarged longitudinal sectional elevation, with the cover in section, of one chain anchor as in use.

FIG. 5 is a plan view, with the cover in section, of said one chain anchor as in use.

FIG. 6 is an enlarged longitudinal elevation of one chain anchor with the cover not shown; the view illustrating the manner of manipulating a chain prepartory to engagement thereof with the anchor block.

DESCRIPTION OF THE PREFERRED EMBODIMENT

Referring now more particularly to the drawings and to the characters of reference marked thereon, the chain anchor of the present invention is primarily adapted—but not limited—for use in pairs to connect to a vehicle the safety chains C which conventioanlly lead forward from a trailer to the vehicle. An exemplary array is illustrated in FIG. 1 wherein a pair of the chain anchors, each indicated generally at 1, are fixed on the rear bumper 2 of a vehicle 3; the chain anchors 1 being disposed equidistantly on opposite sides of the hitch 4 on the forward end of the trailer tongue 5.

Each of the chain anchors 1 is constructed as disclosed in FIGS. 2–6, inclusive, and comprises the following:

A somewhat elongated, upwardly opening, semi-circular trough 6 is disposed horizontally on and fixedly secured—as by welding—to a rectangular base plate 7 adapted to be secured to the top of the vehicle bumper 2 by bolts 8.

Centrally of its ends, the trough 6 is fitted with an upstanding, exteriorly, substantially circular, block 9 which is engaged in matching relation in said trough and fixed therein as by welding.

The anchor block 9 is essentially C-shaped and includes a deep but relatively narrow, upwardly opening, central throat 10. The opposed or outer faces of the anchor block 9 are concave; one concavity being indicated at 11, and the other at 12. Additionally, the anchor block 9 tapers from bottom to top in a transverse vertical plane.

At each end—equidistantly but relatively closely spaced from the anchor block 9—the trough 6 includes, in fixed unitary relation, a guard ring or eye; one being indicated at 13, and the other at 14. Such guard eyes are circular, co-axial with, and of the same diameter as said trough 6.

In use of each chain anchor 1, the related chain C is first threaded through the guard eye 13 or 14, depending on the direction in which the working reach of the chain extends from the chain anchor. The chain is then passed above the anchor block 9, and the non-working or free end portion of the chain threaded through the other guard eye. Nextly, an adjacent vertical link 15 of the chain is inserted in the throat 10 of the anchor block 9 as shown in FIG. 2, and then—by slight chain motion—the immediately adjacent horizontal link 16 or 17 is end-engaged in the concavity 11 or 12 which is opposite the working reach of the chain C as shown in FIGS. 4 and 5. The end-engagement of such horizontal link 16 or 17 in the concavity 11 or 12 remote from the working reach of the chains tends to prevent accidental upward displacement of the vertical link 15 from the throat 10. In the present illustration, the horizontal link 16 is end-engaged in the concavity 11, with the working reach of the chain extending in the direction indicated by the arrow in FIGS. 4 and 5.

Additionally, and also importantly, with the working reach of the chain C extending through guard eye 13 or 14 in relatively closely surrounded relation, there can be only limited vertical loose play of the adjacent portion of said working reach of the chain. Hence, the motion-limiting effect of said surrounding guard eye on such adjacent portion of the working reach of the chain prevents the vertical link 15 from being shifted upwardly sufficient to accidentally escapoe the throat 10. The chain is thus most effectively anchored and in a manner to preclude accidental disconnection from the chain anchor.

However, by reason of the structure of the chain anchor, it is not only easy to manually engage—without hindrance—the chain with the anchor block 9 in the manner previously described and wholly without the use of tools, but—likewise—the chain can, when disconnection is desired, be readily manually disengaged by the simple expedient of manually grasping the link 15 and lifting it out of the throat 10, followed by withdrawl of the chain from the graud eyes 13 and 14.

The chain anchor is provided with a cover 18; such cover being of substantially the same length as the trough 6 and of inverted, substantially semi-circular form, although slightly greater than 180° in arcuate extent whereby, when closed, to snap-engage about the guard eyes 13 and 14. Further, the cover 18 may be hinged, as at 19, for swinging between open and snap-engaged closed position.

From the foregoing description, it will be readily seen that there has been produced such a chain anchor a substantially fulfills the objects of the invention as set forth herein.

While the specification sets forth in detail the present and preferred construction of the chain anchor, still in practice such deviations from such detail may be resorted to as do not form a departure from the spirit of the invention as defined by the appended claims.

I claim:

1. A chain anchor comprising a fixed support, an anchor block rigid with and upstanding from the support, the anchor block having a throat open to the top and to opposite faces of said block, the throat being of a depths to receive—from above and in manually disengageable relation—a vertical link of a chain extending in the general direction that the block faces, an immediately adjacent horizontal link of the chain end-abutting one face of said block, the working reach of the chain extending away from the other face of said block, and guard means on the support embracing an adjacent portion of said working reach of the chain in vertical motion limiting relation.

2. A chain anchor, as in claim 1, in which the guard means is aneye through which the adjacent portion of the working reach of the chain extends.

3. A chain anchor, as in claim 1, in which said one face of the anchor block is concave for reception of the adjacent end of said horizontal link.

4. A chain anchor, as in claim 1, in which said one face of the anchor block is concave for reception of the adjacent end of said horizontal link; the guard means being disposed in relatively closely spaced relation beyond the other face of the anchor block and comprising an upstanding eye through which said adjacent portion of the working reach of the chain extends.

5. A chain anchor, as in claim 4, in which the eye has an inside diameter which premits of only limited vertical loose play of said adjacent portion of the working reach of the chain.

6. A chain anchor, as in claim 1, in which both faces of the anchor block are concave, and the guard means comprises an eye upstanding from the support beyond each such face of the anchor block; said adjacent portion of the working reach of the chain extending through one of said eyes.

7. A chain anchor, as in claim 1, in which the support comprises an upwardly opening trough, the anchor block upstanding in the trough, and the guard means being an eye on the trough in relatively closely spaced relation to the anchor block, said adjacent protion of the working reach of the chain extending through such eye.

8. A chain anchor, as in claim 1, in which the support comprises a base adapted to be mounted on a fixed object, an upwardly opening semi-circular trough secured on the base, the anchor block being exteriorly circular and fixedly engaged in the trough in matching relation thereto, and the graud means comprising a pair of circular guard eyes on the trough adjacent but spaced beyon opposite faces of the anchor block, said guard eyes being co-axial with the trough, and of the same diameter; said adjacent portion of the working reach of the chain extending through the eye beyond said other face of the anchor block, while the non-working reach of the chain extends through the eye beyond said one face of the anchor block.

9. A chain anchor, as in claim 8, in which at least said one face of the anchor block is concave for reception of the adjacent end of said horizontal link.

10. A chain anchor, as in claim 1, in which the support is anupwardly opening trough, the chain anchor being fixed in the trough intermediated its ends, and said guard means comprising a pair of co-axial eyes on the trough adjacent but spaced from the anchor block, said adjacent portion of the working reach of the chain extending through one such eye, and the non-working reach of the chain extending through the other eye; and an openable cover on the trough encompassing said eyes and overlying the anchor block.

11. A chain anchor comprising a fixed support, an anchor block rigid with and upstanding from the support, the anchor block having a throat open to the top and to opposite faces of said block, the throat being of a depth to receive—from above and in manually disengageable relation —a vertical link of a chain extending in the general direction that the block faces, and an immediately adjacent horizontal link of the chain end-abutting one face of said block, the working reach of the chain extending away from the other face of said block, and said one face of the anchor block being concave for the reception of the adjacent end of said horizontal link.

12. A chain anchor, as in claim 11, in which both faces of the anchor block are concave whereby the working reach of the chain may extend, selectively, in opposite directions from said anchor block.

13. A chain anchor, as in claim 11, in which the anchor block is of upwardly opening, generally C-shape; the throat of said C-shaped anchor block being deep and relatively narrow.

14. A chain anchor, as in claim 11, in which the support includes a base adapted to be secured to a fixed object.

* * * * *